Patented Sept. 26, 1950

2,523,868

UNITED STATES PATENT OFFICE 2,523,868

MOISTUREPROOFING REGENERATED CELLULOSE

Linus Marvin Ellis, Wilmington, Del., assignor to E. I. du Pont de Nemours & Company, Wilmington, Del., a corporation of Delaware No Drawing. Application January 3, 1947, Serial No. 720,095

3 Claims. (Cl. 117—73)

This invention relates to moistureproof, heat-sealable, transparent film. More particularly, it relates to the improvement of heat-seal characteristics in moistureproof, heat-sealable, transparent wrapping film having a base of regenerated cellulose.

It is well known that ability to form adhesive bonds by application of heat and pressure to a base film of regenerated cellulose having a moistureproof coating in which nitrocellulose is the film-forming ingredient may be achieved by suitable formulation of the moistureproof coating. The bonds, which are termed heat-seals, formed in this manner represent areas where the coatings have been fused together. It is usually characteristic of these heat-seals that, when they are subjected to stress sufficient to cause separation of the films, failure takes place at the bond between coating and base film rather than between the fused coatings. Extremely thin coatings of the order of 0.00005 inch are generally used in commercial practice to make regenerated cellulose film moistureproof, and the force necessary to rupture such an extremely thin coating is small, so that if adhesion of coating to base film is poor only nominal heat-seal strength will be secured.

A principal object of this invention therefore is to provide a moistureproof coated regenerated cellulose film capable of forming heat-seals of high strength.

Another object is to more tightly bond heat-sealable, moistureproofing coatings containing nitrocellulose to the base film of regenerated cellulose.

A further object is to provide a nitrocellulose-containing, moistureproofing, heat-sealable coating on a base film of regenerated cellulose which coating will retain its enhanced coating adhesion and heat-seal strength even under conditions of high moisture or humidity.

A still further object is to securely anchor nitrocellulose - containing, moistureproofing, heat-sealable coatings to regenerated cellulose base film in a simple and economical fashion. These and other objects will more clearly appear hereinafter.

The objectives listed above are achieved by the process of the present invention in which, briefly stated, regenerated cellulose base film is impregnated with a water soluble ketone-formaldehyde resin and an incompletely polymerized melamine-formaldehyde resin together with an acid catalyst for heat-hardening the melamine-formaldehyde resin, dried preferably under conditions which will effect final polymerization of the melamine-formaldehyde resin, and coated in the conventional fashion with a moistureproof, heat-sealable coating in which nitrocellulose is the chief film-forming component.

In a preferred form of the invention, regenerated cellulose base film in the gel condition is impregnated with an aqueous solution containing a softener for the base film, e. g. a polyhydric alcohol such as glycerol or ethylene glycol, together with suitable proportions of the ketone-formaldehyde resin, the melamine-formaldehyde resin, and an acid hardening catalyst for the melamine-formaldehyde resin. Excess solution is then removed by squeeze rolls or scraper bars, and the film is dried at an elevated temperature, usually around 80–125° C., for a period of time sufficient to remove water and render the melamine-formaldehyde resin substantially insoluble in water, e. g. between about 30 seconds and 5 minutes, preferably about one minute. The dried film is subsequently coated in the customary fashion with an organic solvent solution of the moistureproof, heat-sealing lacquer, and dried at an elevated temperature to remove solvents.

In place of the complex mixtures formed by condensation of acetone with formaldehyde under alkaline conditions, individual compounds separated from these reaction mixtures may be used in the process of this invention. For example, 3-ketobutanol-1 may be separated by distillation at reduced pressure from the acetone-formaldehyde condensation product and this may be substituted for the acetone-formaldehyde condensation product from which it was separated. Likewise, the residue left after removal of a considerable portion of the 3-ketobutanol-1 may be substituted for the acetone-formaldehyde condensation product from which it was derived.

Water-soluble condensation products from formaldehyde and other lower aliphatic ketones may also be used in place of those obtained from acetone and formaldehyde in the process of this invention. For example, methylethyl ketone may be substituted for acetone to prepare a water-soluble condensation product which is obtained in somewhat higher yields than when acetone is used. This product may be used instead of the acetone formaldehyde condensation product to prepare an impregnating solution which in turn is used for the impregnation of the regenerated cellulose film. Likewise, other water-soluble aliphatic ketones having two or more hydrogen atoms attached to a carbon atom adjacent to the carbonyl group may be used to form condensation products with formaldehyde which are useful in the process of this invention. Examples of such ketones are methylisopropyl ketone, methyl vinyl ketone and diethyl ketone. However, use of the condensation products obtained from these ketones generally results in a final coated film of lower heat-seal strength than is obtained when acetone-formaldehyde condensation products are used, so that the latter constitutes the preferred compounds.

The melamine-formaldehyde resins preferred for use in this invention are those incompletely polymerized melamine-formaldehyde resins which are insoluble in water at concentrations of less than 35% resin but are soluble in water at concentrations in the range of 35-70% resin. The resins are preferably derived from about 3 mols formaldehyde per mol of melamine. Such resins may be put into condition for use according to the procedure described by Pitzl in application Serial No. 543,727, filed July 6, 1944, now Patent No. 2,451,867, by first dispersing them in liquid polyhydric alcohols (for example, glycol or glycerol), adding to this dispersion at least 40% hydroxyacetic acid based on the weight of resin, and subsequently diluting the acid-stabilized dispersion with water.

Insolubilization of the resins is accomplished by drying the film at any derived temperature between about 50 and 125° C. until the resins are no longer water-soluble, which generally requires between 30 seconds and 5 minutes depending on the temperature. The preferred drying temperature is between about 80° C. and about 125° C.

Water-soluble or acid dispersable melamine-formaldehyde resins may be used instead of the preferred class consisting of those insoluble in water at resin concentrations below 35% but soluble at some concentration between 35% and 70%. For example, trimethylol melamine or a melamine-formaldehyde condensation product which has not been condensed to the point where it is insoluble in water at low concentration may be used. Likewise, melamine-formaldehyde resins modified to produce water-solubility through formation of ethers with lower alcohols or with dihydric or trihydric alchols may be used. However, somewhat higher proportions of such resins are generally required to secure results equivalent to those obtained by use of resins of the preferred class.

In commercial practice it is preferable to carry out the resin impregnation and the softening of the film in one operation by dissolving the resins and acid catalyst in the softener bath. However, the two operations can be performed independently, e. g. by first impregnating the gel film with an aqueous solution of the resins and acid catalyst, insolubilizing the resins, then impregnating the film with the softener solution.

As acid catalyst there may be used any water-soluble organic carboxylic acid having a dissociation constant between $10^{-5}$ and $10^{-1}$, e. g., formic, acetic, propionic, maleic, phthalic, hydroxyacetic, tarataric acids and the like. The preferred carboxylic acids are those in which the non-carboxylic part of the molecule is hydrocarbon or hydroxyalkyl. Certain inorganic acids in the same range of strength, e. g., phosphoric acid or sulfurous acid, may also be used.

Preferred concentrations for an impregnating bath to be applied to regenerated cellulose base film in the gel condition are: ketone-formaldehyde resin, 0.5-3%; melamine-formaldehyde resin, 0.3-1%; acid catalyst (e. g., hydroxyacetic acid) 0.15-0.6%; polyhydric alcohol 3-12%. A particularly preferred concentration is melamine-formaldehyde resin 0.6%; ketone-formaldehyde resin 2%; hydroxyacetic acid 0.3%; glycerol 6-8%. The impregnated film after drying should contain from about 0.1% to about 3% of each resin.

Numerous moistureproof, heat-sealable coatings containing nitrocellulose as a principal film-forming ingredient are known, and may be used for purposes of this invention. Suitable coatings, for example, are disclosed in Hitt U. S. P. 1,997,583, Mitchell U. S. P. 2,079,379, and Ubben U. S. P. 2,147,180.

The following examples will further illustrate the principles and practice of this invention. Throughout the specification and claims parts and percentages are by weight unless otherwise indicated.

*Example I*

An acetone-formaldehyde condensation product was prepared as follows. Acetone (1500 parts), water (50 parts), and potassium carbonate (20 parts) were placed in a reaction vessel equipped with a stirrer, reflux condenser and temperature indicator. During the course of 2.5 hours, 475 parts 37% formaldehyde solution was added with occasional cooling to keep the reaction mixture temperature between 30 and 35° C. After addition of the formaldehyde solution had been completed, the mixture was stirred at 25-30° C. for one hour. A small amount of a lower layer which separated from the bulk of the reaction mixture was removed, and the balance neutralized with aqueous 5% hydrogen-chloride solution. Volatile materials were distilled from the neutralized reaction mixture at a temperature which did not exceed 100° C. and under a partial vacuum which did not fall below 15 mm. of mercury. There was obtained as the residual product 360 parts of a pale amber liquid.

A dispersion of a melamine-formaldehyde resin was prepared as follows. Twenty parts of a partially polymerized resin obtained by condensing about 3 mols of formaldehyde with 1 mol of melamine and being soluble at about 60% concentration in hot (80°-100° C.) water, was stirred for 3 hours at ordinary temperature with 100 parts glycerol to secure substantially complete dispersion of the melamine-formaldehyde resin. To this was added 10 parts hydroxyacetic acid. After the hydroxyacetic acid had been stirred in, the mixture was diluted with 70 parts water, and a small amount of undispersed material was removed by filtration.

An impregnating solution was prepared by mixing 90 parts glycerol, 2730 parts water, 180 parts of the above melamine-formaldehyde resin dispersion and 60 parts of the above acetone-formaldehyde resin.

A film of regenerated cellulose in the gel condition, containing about 3 times as much water as cellulose and equivalent to a dry film 0.0012 inch in thickness was immersed in the above solution long enough to allow interchange of solution for water in the film to reach equilibrium. After removal of excess solution from its surface, the impregnated film was dried for one minute at 100° C. The impregnated, dried film was then coated with a solution of a moistureproof, heat-sealable lacquer having the following solids composition:

| | Parts |
|---|---|
| Nitrocellulose (11.5% $N_2$) | 50 |
| Dicyclohexylphthalate | 30 |
| Dibutylphthalate | 10 |
| Dammar (dewaxed) | 7.5 |
| Asiatic paraffin | 2.6 |

The above materials were used at 10% concentration in a mixture of 59 parts ethyl acetate, 33 parts toluene and 8 parts ethyl alcohol as solvent.

A quantity of the above solution was applied to the base film sufficient to yield a dry coating approximately 0.00005 inch in thickness. The coated film was then dried for 20 seconds at 100° C. to remove solvents.

The product obtained by the procedure described above is a sheet of regenerated cellulose film with a moistureproof coating which is substantially odorless, transparent, flexible and moistureproof. For convenience in comparing it with samples of control films made as described below, this film is designated test film.

For comparison purposes, a second lot of film designated first control was made by procedure which duplicated the above except that no acetone-formaldehyde resin was used in the impregnating solution.

For a second control, a coated regenerated cellulose film was prepared by the procedure described above except that no melamine-formaldehyde resin or hydroxyacetic acid was used in the impregnating solution.

For a third control, the acetone-formaldehyde resin, the melamine-formaldehyde resin and the hydroxyacetic acid were omitted from the impregnating solution. Otherwise, the procedure used for the preparation of the coated regenerated cellulose film was the same.

A number of heat-seals was made on each lot of film prepared as described above, and the seals from each lot of film were divided into two groups. One group was conditioned to constant moisture content at 50% relative humidity and 25° C., and tested. The other group was soaked for 24 hours in water at 20° C. and tested immediately after removal. The following tabulation shows the relative strength of the heat-seals tested dry, and indicates the retention of heat-seal strength in the water-soak. The data are based on average values secured in a number of tests.

| Film Sample | Relative strength of dry heat-seals | Retention of heat-seal strength in 24 hr. water soak |
|---|---|---|
| Test Film | 60 | good. |
| First Control | 46 | Do. |
| Second control | 45 | Very poor. |
| Third control | 25 | Do. |

The above data show: (1) in the absence of melamine-formaldehyde resin, the presence of acetone-formaldehyde resin in the base film leads to heat-seal strength at a moderate humidity almost double that which would be secured in the absence of this resin but effects little improvement in heat-seal at a very high humidity; (2) presence of both the melamine-formaldehyde resin and the acetone-formaldehyde resin in the base film leads to heat-seal strength at moderate humidity approximately 30% greater than is obtained with either of these resins alone in the base film. In addition, there is good retention of heat-seal strength at high humidity.

*Example II*

A second preparation of an acetone formaldehyde resin was carried substantially in accordance with the procedure described under Example I except that twice the quantity of formaldehyde solution was used. There was no separation of an aqueous lower layer after addition of the formaldehyde solution had been completed, and slightly more hydrochloric acid solution was required for neutralization. Removal of acetone and other readily volatile material was accomplished as described in Example I, leaving as the residual product 480 g. of a viscous brown liquid which was readily soluble in water.

Using the resin thus prepared in the place of the acetone-formaldehyde resin of Example I, the procedures described under Example I for the preparation of an impregnating solution, for the impregnation of regenerated cellophane base film and for the preparation of coated impregnated cellulose film were repeated.

Heat-seals made on films thus obtained and conditioned to constant humidity at 50% relative humidity and 25° C. showed a relative heat-seal strength of 58 in comparisons with the same controls described in Example I. This constitutes about a 25% improvement over the heat-seal strength of control film made as described under Example I with melamine-formaldehyde resin but no acetone-formaldehyde resin in the impregnating solution. Heat-seals which had been subjected to a 24 hour soak in water at 20° C. were directly comparable in strength to those made on the equivalent film of Example I.

*Example III*

An incompletely condensed melamine-formaldehyde resin was prepared as follows: 1 part of trisodium phosphate ($Na_3PO_4.12H_2O$) was dissolved in 267.6 parts of aqueous formaldehyde solution (37% formaldehyde by weight) whose pH had been adjusted to 7.0 with 2% sodium hydroxide solution. The resulting solution was stirred with 126 parts melamine at 86–88° C. for about 5 hrs. at which time a test portion of the reaction mixture gave a precipitate when added to an equal quantity of cold water. The resin thus formed was precipitated by adding to the reaction mixture about 1600 parts of acetone, and after drying was ground to a fine powder. The resin thus formed was insoluble in water at concentrations below 35%, but formed a solution with an equal weight of warm water (40°–50° C.).

A dispersion was prepared by using the above resin in the procedure given in Example I. The dispersion thus prepared and the acetone-formaldehyde resin of Example I were then used in the procedure given under Example I for the preparation of an impregnating solution. Using this solution, regenerated cellulose film in the gel condition was impregnated, dried and coated as described under Example I. The resulting coated film yielded heat-seals directly comparable in strength to those obtained with the equivalent film of Example I.

The terms "heat-seal", "heat-seal strength" and kindred expressions are defined in Mitchell U. S. P. 2,236,546 and are employed herein in accordance with such definitions.

It will be apparent from the above description and specific examples that this invention enables the obtainment, by simple and economical expedients, of a moistureproof, heat-sealable, coated regenerated cellulose wrapping tissue having unusually high heat-seal strengths under all operating conditions likely to be encountered. Furthermore this advantage is achieved without in any way impairing the normal characteristics and usefulness of the coated film. Also the present invention has the distinct advantage that the impregnation of the base film may be carried out in conjunction with the customary addition of softener thereto so that no additional steps are required in the manufacture of the coated film.

It is obvious, of course, that many changes and modifications can be made in the hereinabove described details of the invention, and accordingly it is to be understood that the invention includes all such changes and modifications following within the spirit and scope thereof as defined in the appended claims.

I claim:

1. In a process for producing moistureproof, heat-sealable wrapping tissue having a base of regenerated cellulose, the steps comprising impregnating a non-fibrous base sheet of regenerated cellulose with an aqueous impregnating bath containing from about 0.5 to about 3% by weight of a partially condensed water-soluble ketone-formaldehyde resin, from about 0.3 to about 1% of a partially polymerized trimethylolmelamine resin insoluble in water at concentrations of less than 35% resin but soluble in water at concentrations in the range of 35–70% resin, and from about 0.15 to about 0.6% of hydroxyacetic acid, heating the impregnated base sheet to remove water and to further condense said resins, and thereafter applying a moistureproofing heat-sealable coating containing nitrocellulose as the principal film-former.

2. The process of claim 1 wherein the ketone-formaldehyde resin is an acetone-formaldehyde condensation product.

3. In a process for producing moistureproof, heat-sealable wrapping tissue having a base of regenerated cellulose, the steps comprising impregnating a non-fibrous base sheet of regenerated cellulose with an aqueous impregnating bath containing from about 0.5 to 3% by weight of a partially condensed water-soluble ketone-formaldehyde resin, from about 0.3 to about 1% of a partially polymerized methylolmelamine resin insoluble in water at concentrations of less than 35% resin but soluble in water at concentrations in the range of 35–70% resin, and from about 0.15 to about 0.6% of a water soluble organic carboxylic acid catalyst having a dissociation constant between $10^{-5}$ and $10^{-1}$, heating the impregnated base sheet to remove water and to further condense said resins, and thereafter applying a moistureproofing, heat-sealable coating containing nitro-cellulose as the principal film-former.

LINUS MARVIN ELLIS.

REFERENCES CITED

The following references are of record in the file of this patent:

UNITED STATES PATENTS

| Number | Name | Date |
|---|---|---|
| 2,364,900 | Hessel et al. | Dec. 12, 1944 |
| 2,389,682 | Nebel | Nov. 27, 1945 |
| 2,394,009 | Pollard | Feb. 5, 1946 |
| 2,432,542 | Pitzl | Dec. 16, 1947 |